United States Patent [19]

Knetsch

[11] Patent Number: 5,588,576
[45] Date of Patent: Dec. 31, 1996

[54] FEEDER FOR COMPONENTS, IN PARTICULAR COMPONENTS DESIGNED WITH A HEAD

[75] Inventor: Harold Knetsch, Herborn, Germany

[73] Assignee: Emhart Inc., Newark, Del.

[21] Appl. No.: 424,981

[22] Filed: Apr. 19, 1995

[30] Foreign Application Priority Data

Apr. 21, 1994 [DE] Germany .......................... 9406687 U

[51] Int. Cl.⁶ .............................. B25B 23/04; B23Q 7/08
[52] U.S. Cl. ......................................... 227/119; 227/139
[58] Field of Search ................................ 227/107, 109, 227/112, 119, 120, 130, 135, 139

[56] References Cited

U.S. PATENT DOCUMENTS

| 1,457,552 | 6/1923 | Schmidt | 227/139 |
|---|---|---|---|
| 1,688,879 | 10/1928 | Polzer | 227/139 |
| 2,436,161 | 2/1948 | Bridegroom | 227/139 |
| 3,034,547 | 5/1962 | Cox et al. | |
| 3,046,558 | 7/1962 | Hadnagy | 227/139 |
| 3,114,477 | 12/1963 | Dixon | |
| 4,354,588 | 10/1982 | Wolfertz | 227/119 |
| 4,732,296 | 3/1988 | Heck et al. | 227/119 |
| 5,201,892 | 4/1993 | Salter | |
| 5,236,341 | 8/1993 | Stafford | 227/112 |

OTHER PUBLICATIONS

Research Disclosure, No. 254, Jun. 1985 Emsworth GB, p. 309 "Robotic Mass Transfer Tool".

Primary Examiner—Scott A. Smith
Attorney, Agent, or Firm—E. D. Murphy

[57] ABSTRACT

A Feeder for elongate components, in particular components designed with a head, has a feed tube with an inlet orifice which can be connected to a feed line and an orifice in the top region thereof and a gripper with at least two gripping arms (1) which are provided with a front gripping region (2) and a rear pivot axis region (3).

The gripper is arranged in the feed tube which has, in its top region, a lower plane surface and an upper plane surface opposed to it;

The gripping arms (1) each have a guide step (6) which preferably tapers and extends from the pivot axis region to the gripping region (2) on a longitudinal end face (5) turned toward the upper plane surface, the guide step (6) serving to guide the head of an elongate component; and The gripping arms (1) have, in the gripping region (2), a recess (7) adapted to the external shape of the elongate components to be gripped.

9 Claims, 1 Drawing Sheet

FEEDER FOR COMPONENTS, IN PARTICULAR COMPONENTS DESIGNED WITH A HEAD

BACKGROUND OF THE INVENTION

The invention relates to a feeder for elongate components, in particular components designed with a head such as rivets, studs, pins, weld-in parts, which feeder has a feed tube with an inlet orifice which can be connected to a feed line and an orifice in the top region thereof and a gripper with at least two gripping arms which are provided with a front gripping region and a rear pivot axis region.

Prior art feeders are used wherever cylindrical parts, for example, have to be supplied in large numbers to a further processing station as is the case, for example, in the car industry. Other known examples of these feeders include, for example, rivet setting tools. The feed rate is the critical point as it substantially determines the productivity of a production process.

At high feed rates there is the risk with numerous feeders that components to be supplied will jam or will be supplied in a tilted manner. Therefore, a gripper for the components to be supplied is provided in feeders so that the components can be gripped and can be reliably placed on the further processing station. In known feeders, for example, the gripper is arranged outside a feed tube. The gripper consisting of two gripping arms rests on plane supports which, at the bottom, limit the feed chamber which is designed to taper between the gripping arms of the gripper. In their back region, the gripping arms have pivot pins which are inserted into holes in this support and allow pivoting of the gripping arms in order to open and close the gripper. The plane support is an integral part of a feed channel which is located in front of the pivot axes of the gripping arms in the conveying direction of the supplied parts and is limited by two vertical lateral walls but is open at the top. Therefore, the components to be supplied are able to escape upwardly and, under undesirable conditions, can leave the feed channel completely on the one hand or jam in it and make the supply of further components impossible on the other hand. The problem of tilting occurs mainly with those components which are to be supplied and are designed with a head, the dimensions of the head generally being greater than the shank dimensions. These components are, for example, rivets. However, to prevent the components which are to be supplied from tilting, it is necessary to reduce the feed rate of the components. However, this reduces the speed of the production process.

It is accordingly the object of the present invention to provide a feeder with which jamming or tilting of the components to be supplied is avoided even at high feed rates.

BRIEF SUMMARY OF THE INVENTION

The present invention provides feeder for elongate components, in particular components designed with a head, which has a feed tube with an inlet orifice which can be connected to a feed line and an orifice in the top region thereof and a gripper with at least two gripping arms which are provided with a front gripping region and a rear pivot axis region, characterised in that a) the gripper is arranged in the feed tube which has, in its top region, a lower plane surface and an upper plane surface opposed to it;

b) the gripping arms each have a guide step which preferably tapers and extends from the pivot axis region to the gripping region on a longitudinal end face turned toward the upper plane surface, the guide step serving to guide the head of an elongate component; and c) the gripping arms have, in the gripping region a recess adapted to the external shape of the elongate components to be gripped.

The gripping arms have a front gripping region in which the actual gripping process takes place and a rear pivot axis region which allows pivoting of the gripping arms in order to open and close the gripper.

To enable the components which are to be supplied to be supplied as far as possible in a closed channel close to the actual gripping region of the gripping arms, the gripper is arranged in a feed tube. The feed tube has, in its top region, a substantially rectangular cross-section in which a lower plane surface and an upper plane surface opposed to it support the gripping arms in their pivot axis region. The gripping arms each have a guide step on a longitudinal face turned toward the upper plane surface, the guide step extending from the pivot axis region to the gripping region and preferably tapering in this direction so that the head of an elongate component can be supplied to the gripping region of the gripper on the upper plane surface in the guide step which forms a groove-like guide together with the upper plane surface.

The gripping arms of the gripper of the feeder are preferably compressed by a spring arrangement in order to hold the supplied component before it is supplied to a further processing station or if it is to be held at the further processing station which can be, for example, a riveting station or a welding station.

To prevent the components which are provided with a head and are to be supplied from being tilted in the gripping region, the recess in the gripping region of the gripping arms preferably has an enlarged region which serves to receive the head of the component. The guide step formed in the gripping arms in each case opens into this enlarged region of the recess.

For reasons of assembly and exchangeability, the upper portion of the feed tube is divided. The upper portion of the feed tube forms an upper part of which the internal surface forms the upper plane surface in the substantially rectangular top region of the feed tube. The gripping arms have hinge pins in their pivot axis region. Two respective holes for receiving these hinge pins are arranged in the removable upper part and in the lower plane surface opposed to it. The gripping arms of the grippers can therefore perform a pivoting movement so on the one hand the arms open and close and on the other hand, in the closed state, the gripper can perform a movement permitting displacement of the gripped component in a plane perpendicular to its longitudinal axis. The opening movement of the gripping arms is limited by the other two internal lateral surfaces of the top region of the feed tube which is substantially rectangular in cross-section.

The gripping arms are preferably designed so that they merely touch one another in the front region between the recess and the outer arm end in a state in which there is no component in the gripping region.

In the feed tube, the gripping arms preferably have a tapering space extending from the pivot axis region to the gripping region for the supply of the components. The thickness of the gripping arms with respect to a plane perpendicular to the gripper axis decreases toward the gripping region but increases from a cross-sectional area in the longitudinal direction of the gripping arms such that the space tapers more markedly from this cross-sectional area than in the region following the pivot axis region in the direction toward the gripping region.

To enable the feeder to perform precise adjustment or positioning of the part to be supplied to the further processing or arrangement station, the feeder co-operates with a plunger which on the one hand permits the introduction of the component to the further processing or fastening station and on the other hand performs adjustment in precisely the desired position. For this purpose, the gripping arms have a step on a front edge of the removable upper part, forming a higher front region of the gripping arms. This higher front region is offset at the outer ends of the gripping arms, more specifically by a width substantially corresponding to the width of the head of the elongate components. The head of the plunger which also has a centering function is designed such that, in the gripping state of the gripper, it fits into this offset of the front region of the gripping arms so that the lateral movement of the gripper in the feed tube, leading to decentering, is prevented.

Further advantages, features and possible applications of the present invention are described with reference to an embodiment in conjunction with the drawings.

DETAILED DESCRIPTION

Figure 1:
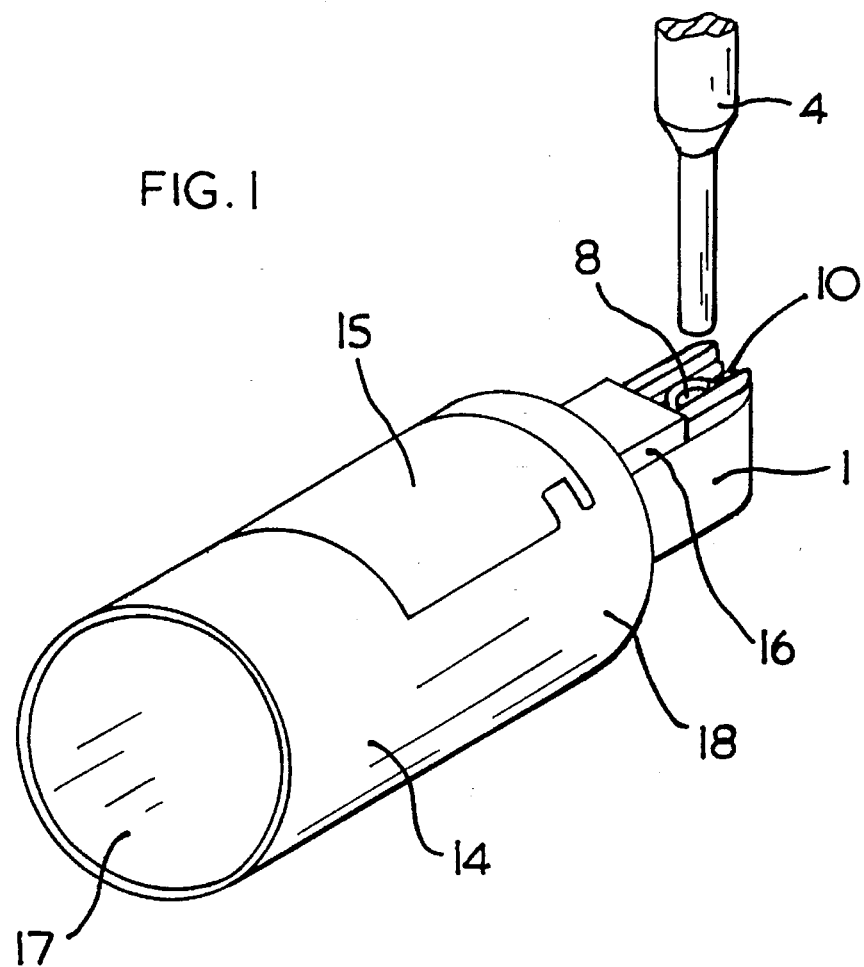
FIG. 1 shows a feed tube with gripper and plunger according to the present invention.

FIG. 1 shows an advantageous embodiment of a feeder according to the present invention. The feeder consists of the feed tube 14 having an inlet orifice 17 provided on a hose advantageously for pneumatic conveyance of the components to be supplied and a front outlet orifice 18. The feed tube 14 receives the gripper in its interior. For this purpose, the top region of the feed tube 14 has a removable upper part 15, 16 which forms the upper plane surface of a substantially rectangular cross-section in the interior of the top end of the feed tube 14. In the removable upper part 15, 16 and in the lower plane surface opposed to its interior there are provided two respective holes which serve to receive pivot pins or hinge pins 9 located in the pivot axis region 3 of the gripping arms 1. A piece 16 of the removable upper part 15, 16 projects with respect to the outlet orifice 18 of the feed tube 14 and therefore extends directly adjacently to the gripping region of the gripping arms 1. The feed channel formed in the space between the gripping arms of the gripper and the upper plane surface is therefore closed so that the head of the component to be supplied cannot issue from the channel. Tilting of the component to be supplied is therefore ruled out even at high feed rates.

Figure 2:
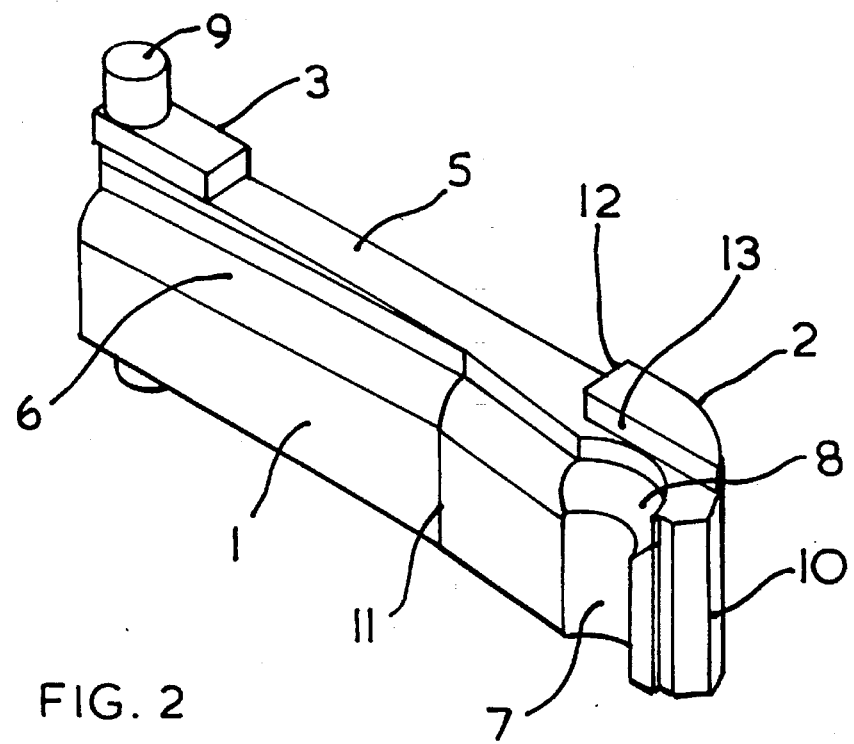
FIG. 2 shows a gripping arm of the gripper according to the present invention.

FIG. 2 shows an individual gripping arm 1. The gripping arm 1 has a gripping region 2 and a pivot axis region 3. In the gripping region 2 there is provided a recess 7 which substantially corresponds to the external shape of the component to be supplied. To allow great flexibility with respect to the shape of the components to be supplied, the recess can also have longitudinal grooves of any shape in the axial direction of the component to be supplied so angular components can also be reliably gripped and held. The gripping arms 1 are spring loaded from the exterior so they are invariably compressed. Only the gripping arm ends make contact in the component-free state. In the upper region, the gripping arms 1 have a guide step 6 which faces the upper plane surface of the feed tube 14, is machined obliquely and tapers from the pivot axis region 3 toward the recess 7 of the gripping region. The upper region of the recess 7 of the gripping region of the gripping arms 1 has an enlarged region 8 into which the guide step 6 opens. The guide step 6 serves for the reliable supply of an elongate component provided with a head into the gripping region 2 through the space formed between the gripping arms 1. This space tapers more markedly forwardly in the direction of the gripping region 2 from a specific portion 11 of the gripping arms 1 than in the region before it with respect to the feed direction of the component to be gripped. As a result, the component is snapped into the recess 7 in the gripping arms 1 subjected to spring tension and is held there owing, among other things, to the moment of inertia during supply. The components which are supplied individually at high speed, preferably pneumatically, initially press the gripping arms 1 apart, are decelerated in the process and then come to a standstill precisely in the recess. With respect to the projecting piece 16 of the removable upper part 15, 16 of the feed tube 14, the gripping arms 1 have a step 12 which extends close to the front edge of the projecting region 16 but still allows a lateral movement of the gripping arms 1 round the pivot axis without contacting this front edge. At the outer ends of the gripping arms above the enlarged region 8 there is also machined a centering step 13 in which a plunger 4 assuming a centering function can engage. This plunger 4 enables the component which is to be supplied to be positioned precisely in the supply station. The component to be supplied is pressed out of the recess 7 in the gripping region 2 of the gripping arm 1 by the plunger 4 against the effect of the spring force.

What is claimed:

1. A feeder for elongated components comprising a feed tube, said feed tube having an inlet orifice adapted for connection to a feed line and a gripper with at least two gripping arms (1) with a channel therebetween, said arms having a front gripping region (2) and a rear pivot axis region (3), characterized in that
    a) said feed tube has an internal cross section with a lower plane surface and an upper plane surface opposed to said lower plane surface, and said gripper being disposed partially in said feed tube and including an outwardly extending portion;
    b) said gripping arms (1) each have a guide step (6) tapering and extending from said pivot axis region to said gripping region (2) said guide step facing toward said upper plane surface, said guide step (6) serving to guide an elongated component; and
    c) said gripping arms (1) have, in the gripping region (2), a recess (7) corresponding to the external shape of the elongated components to be gripped.

2. A feeder according to claim 1, and further including a spring biasing said gripping arms (1) together to hold the elongated components.

3. A feeder according to claim 1, characterized in that said recess (7) includes an enlarged region (8) for receiving a head of a component, said guide step (6) opening into said enlarged region.

4. A feeder according to claim 1, characterized in that said gripping arms (1) include hinge pins (9) in the pivot axis region, said hinge pins being adapted for mounting in respective holes in the upper plane surface and in the lower plane surface in said feed tube.

5. A feeder according to claim 4, characterized in that said gripping arms (1) contact one another in the front region beyond said recess (7) at an outer end of the gripping arms when the gripping region (2) is free from components.

6. A feeder according to claim 5, characterized in that said gripping arms form a tapering channel for the supply of components from the pivot axis region (3) to the gripping region (2).

7. A feeder according to claim 6, characterized in that the thickness of the gripping arms increases in the direction from an intermediate point (11) toward said gripping region such that said channel tapers more sharply from said point (11) to said gripping region than between said pivot axis region (3) and said point.

8. A feeder according to claim 4, characterized in that the gripping arms (1) are provided with a step (12) on an outward extremity thereof, said step being located at the end of said portion (16), said steps being located outside of the circumferential extent of said recess (7) to contain components therein and to receive a centering plunger therethrough.

9. A feeder according to claim 1, characterized in that said feed tube includes a portion 16 which projects above said outwardly extending portion of said gripping arms, said portion (16) being sufficiently wide to cover said channel between said gripping arms (1) in any pivoted position thereof to contain components therein.

* * * * *